United States Patent [19]
Schmid et al.

[11] Patent Number: 5,377,075
[45] Date of Patent: Dec. 27, 1994

[54] BALLAST CRADLE AND RETROFIT FOR FLUORESCENT LIGHT CONVERSION

[75] Inventors: John Schmid, Edison; Steven J. Schmidt, Morristown, both of N.J.

[73] Assignee: ML Systems, Valhalla City, N.Y.

[21] Appl. No.: 237,823

[22] Filed: May 4, 1994

[51] Int. Cl.5 .............................................. H02B 1/30
[52] U.S. Cl. .............................. 361/674; 174/DIG. 2; 315/276
[58] Field of Search ............ 174/DIG. 2, 59; 336/65, 336/67–68, 90; 315/276–277; 361/674, 730, 641

[56] References Cited

U.S. PATENT DOCUMENTS

| | | | |
|---|---|---|---|
| 3,302,017 | 1/1967 | Handson et al. | 174/DIG. 2 |
| 3,899,632 | 8/1975 | Alley | 361/641 |
| 4,674,015 | 6/1987 | Smith | 174/DIG. 2 |

*Primary Examiner*—Gregory D. Thompson
*Attorney, Agent, or Firm*—Elroy Strickland

[57] ABSTRACT

Apparatus for modifying an existing fluorescent light fixture having a base, the apparatus including a panel for attaching to the base. The panel was opposed electrical sockets for receiving terminal pins of a fluorescent tube. An opening is provided in the panel sized to receive an electronic ballast. Over the opening and attached to the panel is a cradle for support the ballast. The panel, with the cradle and ballast, is attachable to a base of an original fluorescent light fixture.

5 Claims, 1 Drawing Sheet

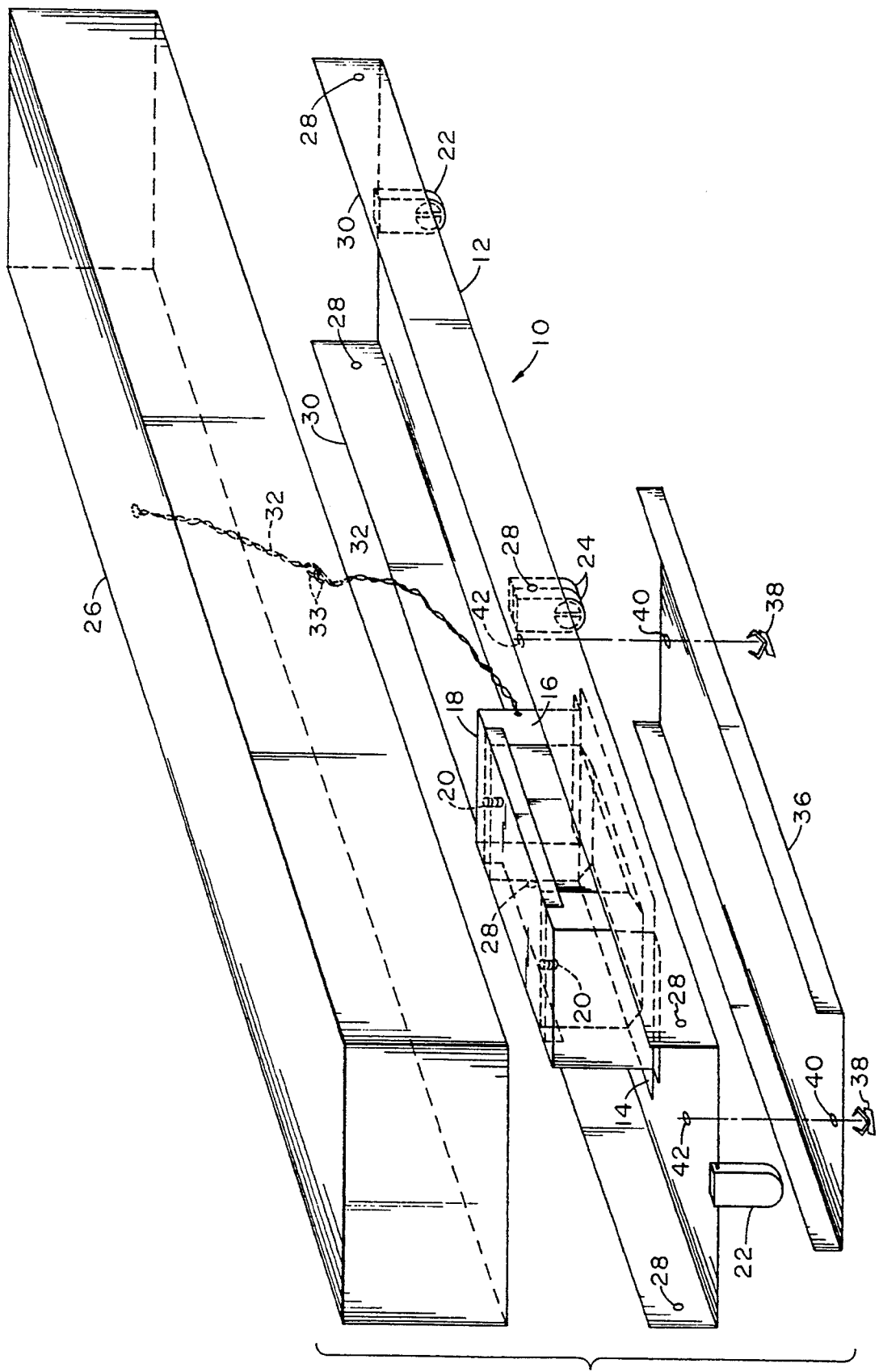

BALLAST CRADLE AND RETROFIT FOR FLUORESCENT LIGHT CONVERSION

BACKGROUND OF THE INVENTION

The invention relates generally to fluorescent light fixtures that require a ballast to operate the fluorescent tubes of the fixture, and more particularly, to fluorescent light components that convert energy-consuming high wattage fixtures to energy-saving low wattage devices.

In large stores and industrial buildings, there are often hundreds of fluorescent lights that form strips of light on or near the ceilings of such stores and buildings. Such lights contain a ballast that supplies the fluorescent tubes with AC energy that ionizes a gas contained within the tubes. Old ballasts are usually oil-filled and possibly contain PCB's and are not therefore environmentally favored. Such ballasts are, in addition, not energy efficient, as they have a high power factor.

Similarly, the wattage of four-foot fluorescent tubes used in relatively old fixtures will run as high as 40 watts apiece, and eight-foot tubes, as high as 215 watts VHO (very high output). The combination of oil-filled ballasts and high wattage tubes consumes a substantial amount of energy. This can be corrected with the use of electronic, low power factor ballasts and lower wattage fluorescent tubes that still produce sufficient light output.

What is needed in the art, and particularly in the strip light art that can include hundreds of such fluorescent tubes drawing substantial amounts of current, is a simple capability to provide such figures with low wattage tubes and low power factor ballasts in a simple and economical manner.

BRIEF SUMMARY OF THE INVENTION

The present invention accomplishes such a task by mounting a dry electronic ballast on a panel member sized to fit the bases of existing light fixtures, which may be mounted on or suspended from current ceilings. The subject panel member is provided with a cradle for holding the ballast on the panel member and within the original base, the panel member being provided with an opening in alignment with the ballast and cradle so that a defective ballast can be easily accessed and removed from the panel through the opening and a new ballast inserted through the opening and be quickly attached to the cradle.

THE DRAWING

The invention, along with its objectives and advantage, will be better understood from consideration of the following detailed description and the accompanying drawing which shows in a partially exploded view the arrangement of the invention.

PREFERRED EMBODIMENT

Referring now to the drawing figure, a system, preferably pre-packaged is depicted for converting an existing fixture (not shown except for a base channel 26) to an energy-saving fixture 10 comprised of a panel 12 having an opening therein sized to receive a ballast 16. Over the opening is located a cradle 18 to which the ballast is secured. The cradle is mounted on and secured to the upper face of the panel using appropriate fastening means, such as pop rivets (not shown). The ballast can be secured to the cradle by metal nuts (not shown) threaded onto posts 20, the posts extending downwardly (in the figure) from the cradle.

Panel 12, in addition, has electrical sockets 22 attached to the ends thereof for receiving the terminal pins at the ends of a fluorescent tube (not shown). Additional, back-to-back sockets 24 are shown in partial outline in the drawing. These sockets are located on panel 12 at a distance midway between sockets 22 if fixture 10 is adapted to use fluorescent tubes shorter than one that would extend between socket 22. For example, an eight-foot tube might be used for sockets 22, while two four-foot tubes would be used for sockets 24 and 22.

An existing elongated channel or housing 26 is shown in the drawing. This channel remains from a prior fixture after the existing cover, ballast and fluorescent tubes (not shown) have been removed. The channel may still be attached to or suspended from the ceiling of a building. The removal of existing components prepares the base for use with low energy components such as thirty-two watt bulbs and a dry, electronic, low power factor ballast 16. A suitable electronic ballast includes the OS RAM Quictronic TO-2X32/120IS ballast made in Montgomery, N.Y., which is electrically connected to sockets 22 and/or 24 by appropriate electrical means (now shown). Other electronic ballasts, of course, can be used.

Panel 12 can be attached to channel base 26 by six self-tapping, metal screws (not shown) directed through six pre-drilled holes 28 provided in upwardly extending sidewalls 30 of the panel. The screws have a drill bit type of tip that will penetrate the walls of channel 26 when forced against the walls in the process of attaching the panel to the channel. The breadth of panel 12 is sized to locate walls 30 on the outside of channel 26.

A small, two-piece safety chain 32 is preferably supplied with panel 12 for holding the panel in place when a workman must install the panel on an existing channel base 26 secured to a high ceiling. One piece of the chain is secured to the upper base wall of the existing channel about sixteen inches from one end of the channel. The other piece of the chain is already secured to panel 10. In the figure, the lower end of the chain is shown connected to the inner end of cradle 18. The loose ends of the two chains can then be hooked together by an S-hook or suitable means so that one end of the panel is connected to channel 26. The ends of the S-hook can be squeezed together by a pair of pliers to make sure the panel does fall from the channel.

The other end panel 10 is now rotated to channel 26, and metal screws inserted through holes 28 to affix the panel to the channel. The depth of the channel is sufficient to receive cradle 18 and contain ballast 16.

When panel 10 is rotated into place against channel 26, the chain is contained within the enclosure provided, by the panel and channel. Hence, the chain remains in place and attached if there is a future need to remove the panel from the channel.

With panel 10 secured to channel 26, a lid 36 can be used to cover opening 14 in the panel. The lid is preferably attached to the panel by two quarter-turn fasteners 38 that extend through openings 40 and 42 provided, respectively, in cover 36 and panel 12.

It can be appreciated that if system (fixture) 10 is pre-packaged, conversion of an existing fixture is easy and rapid. Further, with cradle 18 and an opening 14 directly in line with the cradle, an old or deflective ballast is easily accessed for removal, and a new ballast readily insertable through the opening for attachment to the cradle.

While the invention has been described in terms of preferred embodiments, the claims appended hereto are intended to encompass all embodiments which fall within the spirit of the invention.

What is claimed is:

1. Means for modifying an existing fluorescent light fixture having a base, said means comprising:
   a panel for attaching to the base, said panel having opposed electrical sockets for receiving terminal pins of a fluorescent tube,
   a ballast electrically connected to said sockets,
   a cradle for supporting said ballast on said panel, and
   an opening provided in said panel in substantial alignment with said cradle and ballast,
   said opening providing access to said ballast.

2. The means of claim 1 in which said ballast is an electronic ballast.

3. The means of claim 1 including a cover for closing said opening in said panel, and fasteners for attaching said cover to said panel.

4. A fluorescent fixture having component parts capable of being assembled in the field within an existing base of a fluorescent fixture, comprising the combination of:
   a panel sized to fit on and be attached to the existing base,
   an opening provided in said panel,
   a ballast, and
   a cradle member located on said panel for supporting said ballast on said panel in alignment with said opening and within said base when said panel is secured to the base,
   said opening providing access to said ballast and being of a size to accommodate said ballast for removal of said ballast from said cradle and panel.

5. The fixture of claim 4 in which said ballast is an electronic ballast.

* * * * *